Figure 1:
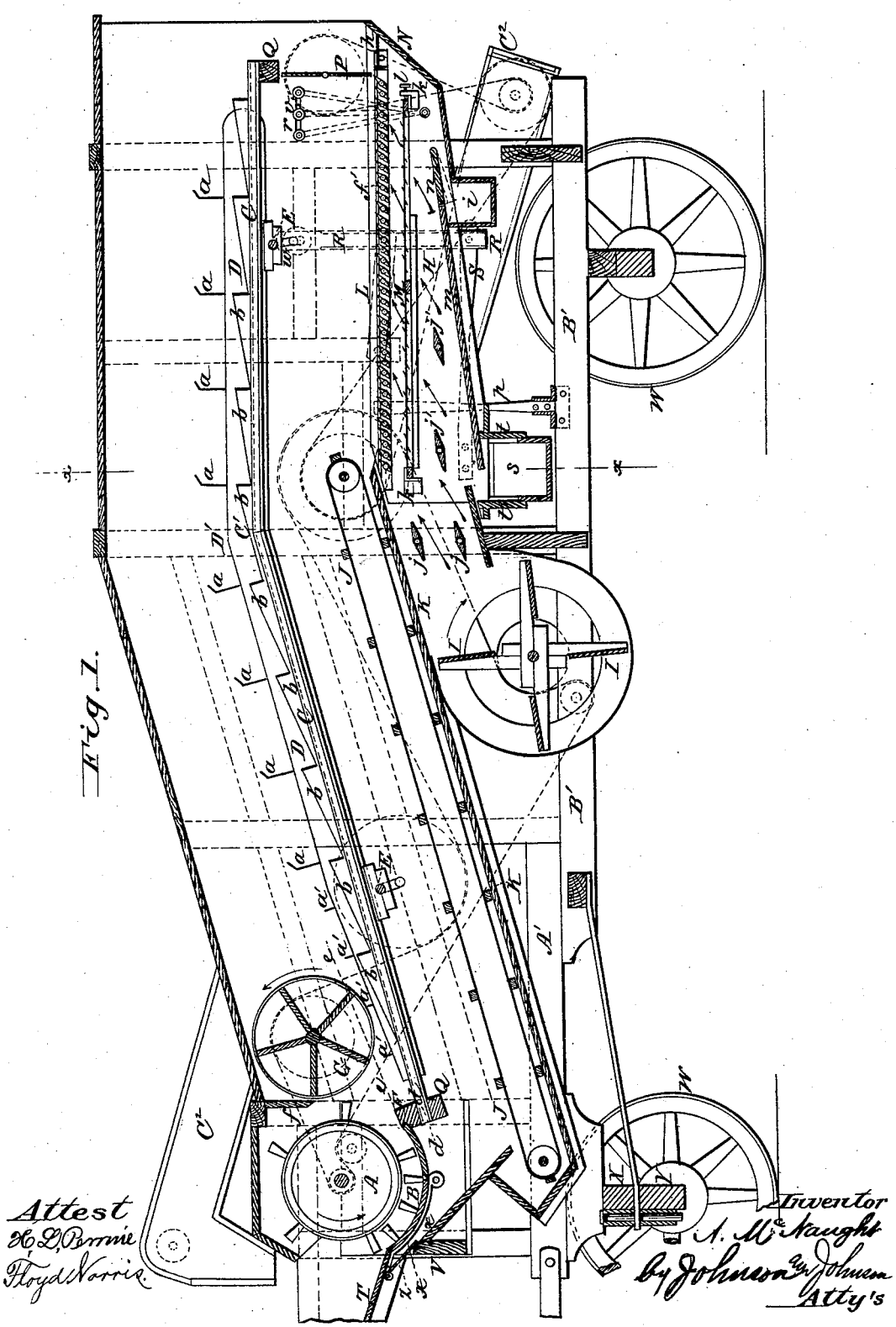

(No Model.) 3 Sheets—Sheet 1.
A. McNAUGHT.
GRAIN THRASHER AND SEPARATOR.

No. 247,466. Patented Sept. 20, 1881.

Attest
H. D. Bonnie
Floyd Norris.

Inventor
A. McNaught
by Johnson & Johnson
Atty's (No Model.)   3 Sheets—Sheet 2.
A. McNAUGHT.
GRAIN THRASHER AND SEPARATOR.
No. 247,466.   Patented Sept. 20, 1881.
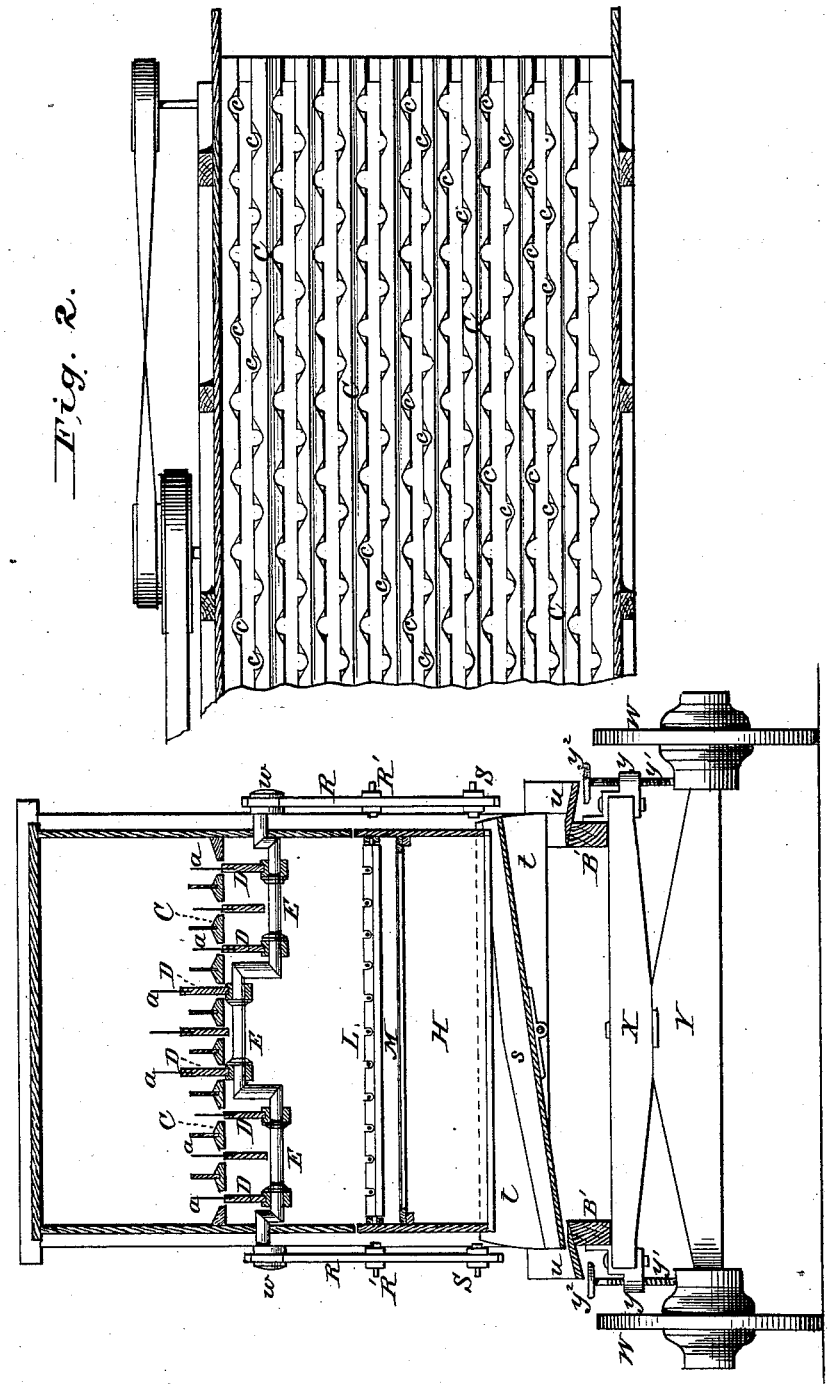

(No Model.) 3 Sheets—Sheet 3.
A. McNAUGHT.
GRAIN THRASHER AND SEPARATOR.
No. 247,466. Patented Sept. 20, 1881.
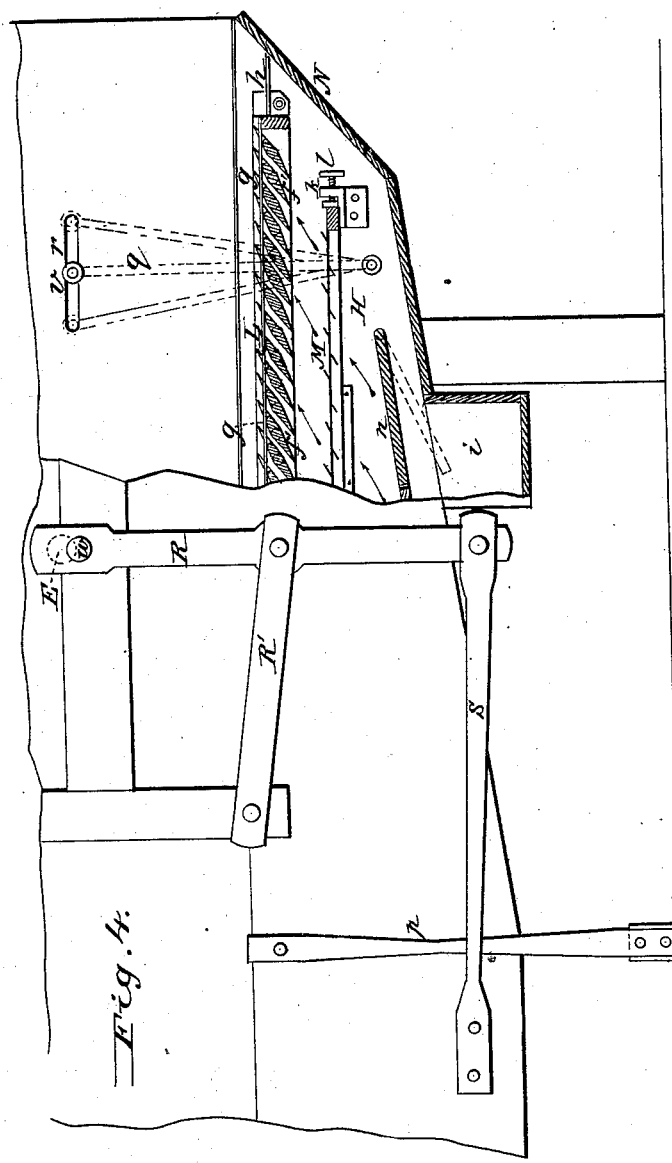
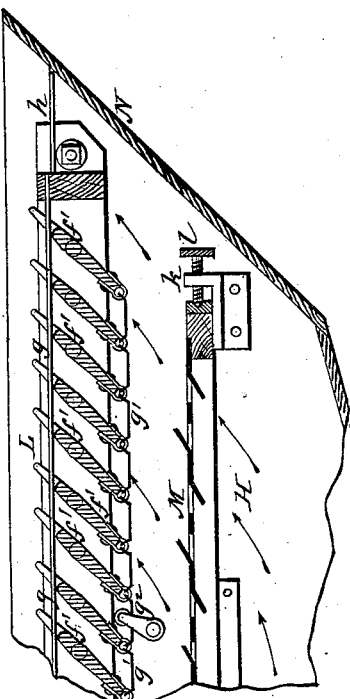
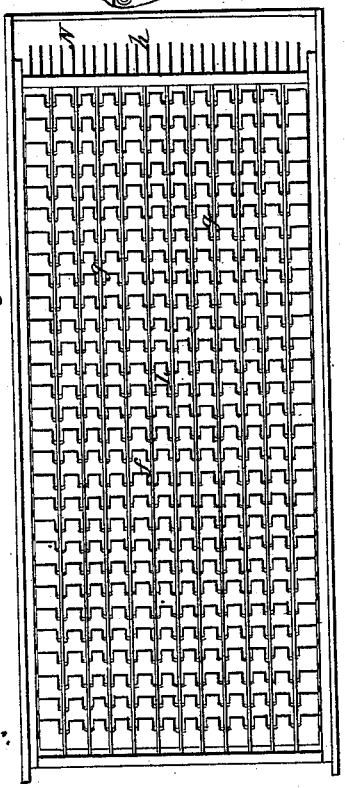
Attest:
H. L. Perrine
Floyd Norris
Inventor.
A. McNaught
By Johnson and Johnson
Atty's

UNITED STATES PATENT OFFICE.

ARCHIBALD McNAUGHT, OF BARABOO, WISCONSIN, ASSIGNOR TO WILLIAM A. NIXON, OF WASHINGTON, DISTRICT OF COLUMBIA.

GRAIN THRASHER AND SEPARATOR.

SPECIFICATION forming part of Letters Patent No. 247,466, dated September 20, 1881.

Application filed June 5, 1880. (No model.)

*To all whom it may concern:*

Be it known that I, ARCHIBALD MCNAUGHT, a citizen of the United States, residing at Baraboo, in the county of Sauk and State of Wisconsin, have invented new and useful Improvements in Grain Thrashers and Separators, of which the following is a specification.

I have improved the style of grain thrashing and separating machine patented to A. F. Dunbar and myself February 5, 1867, and in which the separator is composed of parallel bars forming a slotted platform, and vertically and longitudinally reciprocating bars, having pins in their upper edges and working through the slots of said platform, and upon which the straw and grain are received from the thrashing-cylinder, and which rise a considerable distance above said platform and descend entirely beneath it, for the purpose of giving the straw an intermittent vertical movement by a quick upward thrust and a quick rearward movement, thus shaking and tossing the straw above the platform and freeing the grain therefrom, so that it passes through the slots.

The objects of my improvements are to provide for the more complete and effective separation of the grain from the straw, not only at the point where it is thrown upon the platform, but in the passage of the straw over the platform, the fixed and moving bars of which form cross angle-ridges at the junction of upwardly-inclined and horizontal planes at or near the middle of their length, so that the angle-ridges of the toothed moving bars will operate across and above and below the cross angle-ridges formed by the fixed bars, and thus not only cause the straw to move with different speeds over the different planes of the fixed bars, but effect a thinning and pulling apart of the straw as it is thrown by the moving bars over the fixed cross angle-ridge, and to render the machine more complete, effective, and durable in particulars of construction. I attain these objects by the machine illustrated in the accompanying drawings, in which—

Figure 1 represents a vertical longitudinal section of the complete machine, the vertically-reciprocating toothed beating and conveying bars being shown in the highest position of their movements; Fig. 2, a top view of a portion of the slotted platform; Fig. 3, a cross-section on the line *x x* of Fig. 1, showing specially the reversible grain-discharging spout and the means for preventing the swaying and jarring movements of the machine when at work; Fig. 4, a view, partly in section, showing the supplemental separating platform or rack, and partly in elevation, showing the mechanism for working and adjusting the shoe to facilitate or retard the passage of the straw and coarse matter over said supplemental separating-platform; Fig. 5, an enlarged sectional view of the supplemental separating-platform, and Fig. 6 a top view of the same.

The thrashing-cylinder A works in an open or grated concave, B, and the fan and the shoe are arranged under the rear portion of the straw-carrying and grain-separating slotted platform. In the said patent this slotted platform has an unbroken inclination from the cylinder to the discharge end, and consequently the rear end of the machine is high, top-heavy, and unwieldy, by reason of its overhanging rear part, and the grain and chaff are worked down an inclined board to the shoe-sieve; but by my present improvements I gain the advantage of a low-down machine in which a portion of the grain and chaff from the platform is carried up an inclined board to a second separator, forming part of the shoe, and arranged above the sieve thereof.

The bars C, which form the platform, extend parallel from the concave to the rear end of the machine, leaving spaces between them, through which work the beating and straw-carrying bars D, which are provided with pins *a* on their upper edges. That portion of the platform-bars which joins the concave extends therefrom at a considerable upward inclination a distance which I prefer shall be greater than half the whole length of said platform, and from the termination of such inclined portion the platform-bars extend horizontally, or nearly so, forming a ridge, C', at the angle-junction. The bars D have the same form and angle-ridge D' corresponding to that of the fixed bars. The toothed bars are mounted in sets upon cranked shafts E, arranged beneath the platform, and so that said bars will be projected a considerable distance above the bars C, and to be carried down beneath said fixed bars in their vertically and longitudinally reciprocating movements. This construction of fixed and movable platform-bars divided into ascending and horizontal sections gives a much greater separating capacity than if either inclined from end to end or horizontally from end to end, for the reason that the straw is pulled apart as it is carried or tossed over the angle-ridges C' D', being moved much more rapidly along the horizontal than the inclined portion of the fixed bars C, which increased movement of the straw necessarily renders it thinner than that rising the inclined platform part, and the straw is so completely and advantageously opened and beaten that few, if any, kernels of the grain will pass off with it. These results are produced by the co-operation of the fixed and moving members of the platform in which the straw is at regular intervals in motion and at rest. The fixed bars C are beveled or sloping on their upper faces, which, in connection with notches c, Fig. 2, alternately arranged in the edges of said bars, make the spaces between said bars proportionately greater to the thickness of the moving bars than in the said patent, and renders the escape of the grain and chaff free whether the bars be in their elevated or depressed positions. The fixed bars are also provided with pins or angle-blocks b, which co-operate with the moving pins a, to open and tear the straw apart, as the said bars D, in moving toward the cylinder at their least elevation, act by their pins to pull the straw against the ends of the fixed angle-blocks b, and thereby free and let out the grain and chaff, so that it will pass through the slots throughout the length of the platform. This action, in connection with the alternate advance and backward movements of the beating-bars in sections, and with a carrying-surface of both fixed and movable parts, having each a dividing angle-ridge, gives the most thorough and effective separation of the grain from the straw.

The fixed bars C of the platform do not join the concave in the same plane, but form a ledge or offset, F, (shown in Fig. 1,) with an opening or openings, d, just beneath the rear edge of the concave and leading from the surface of said platform-bars C into a closed space below. Through this opening d the grain from the cylinder is driven by the co-operation of the toothed moving bars C and a deflector, G, composed of five wings and placed relatively with the fixed and moving bars so that one of said wings may be all the time on the line c, which is in a plane with the surface of the concave, to prevent the grain from being thrown by the cylinder beyond said deflector. The deflector is placed in advance of this ledge and open space, so as to drive the loose grain forward of a perpendicular line through its center toward the ledge or offset F and through the opening formed at this point. The deflector, in fact, is arranged to stop the flying grain, and for this purpose its wings must work below the line of discharge from the cylinder.

In feeding the machine with heavy short damp grain, or in cases where there is but little straw, the grain is liable to bunch up between the deflector and the cylinder; but with the ledge F this cannot occur, as the straw and bunches will be swept past the ledge by the cylinder and picked up by the toothed beating-bars, and, with the co-operation of the deflector, passed beyond the ledge. For this purpose the upper edges of the inner ends of the toothed beating-bars C are beveled or sloping, and the pins $a'$ on these sloping parts are shorter than the others, and the wings of the beater, passing over these short pins, tear the straw apart over them and tear and break up any bunches that may be thrown from the cylinder, and thus liberate the grain from the straw. This result is facilitated by reason of the difference in the rate of travel of the wings of the deflector and that of the toothed beating-bars, which is about three hundred feet per minute, while the speed of the outer edges of the deflector-wings is about fifteen hundred feet per minute, and, having five wings, they engage with the straw two thousand times a minute. Consequently the straw contained in each sheaf must be passed beyond the deflector with a tearing action over the pins of the moving bars. The deflector performs the function, in connection with the cylinder and a board, f, depending from the casing in position close to the front side of said deflector, of creating a sufficient draft to draw the dust from the cylinder and into the machine, instead of forcing it out in front of the cylinder into the feeder's face. This result is effected by the co-operation of the angle-blocks b of the fixed bars, which serve to prevent the straw from slipping back against the deflector when the toothed beating-bars are below the platform, for, were this not the case, the straw would be liable to be carried over against this board f and choke the deflector, rendering it necessary to stop the machine to remove the straw.

The sheaf is fed with the grain-heads into the cylinder, which revolves at about twelve hundred revolutions per minute. Its diameter is about seventeen inches, and the circle described by the outer ends of its teeth is about twenty-two and a half inches, so that their rate of travel is about seven thousand feet per minute, and moving with such velocity it will strip the grain from the heads the instant the sheaf touches the cylinder, and at the same instant almost the grain is dashed against the deflector, which as quickly dashes it down through the slots in the separating-platform and through the opening d at the concave ledge. The grain is thus disposed of before the succeeding sheaf is fed to the cylinder, because the feeder is not quick enough to make the feed unbroken.

The cleaning-shoe H is arranged just beneath the rear horizontal portion of the platform, and the fan I is placed in relation thereto so that it will be in position about the middle of the length of the frame, giving the advantage of obtaining a low-down cylinder and of taking the cleaned grain from the shoe above the sills and delivering it to the cylinder at a less height than hitherto possible in this style of machine. By this construction I am enabled to dispense with the inclined returning-board heretofore used in this style of machine in close proximity to and in connection with the longitudinal movements of the beating-bars to work the grain and chaff down to the shoe, and I employ instead thereof an upwardly-inclined open endless slat carrier, J, the slats whereof work in connection with a bottom board, K, extending from beneath the cylinder to a point a little beyond the angle-ridge of the platform, where the slotted platform and the grain-board K overhang the inner end of a supplemental separating-platform, L, and upon which the said slatted carrier delivers evenly and regularly that portion of the grain and chaff which is driven through the ledge-opening $d$ at the junction of the concave and slotted platform and that portion which falls through the slots of the inclined section of said platform upon the grain-board. That portion of the grain and chaff which falls through the slots of the horizontal portion of the platform is received by this second platform, and is evenly distributed over its entire surface. This second platform, L, forms the top of the shoe, and is directly over the sieve M, and it extends from the grain-elevating slat carrier nearly to the tail-board N of the shoe-casing and beyond the rear termination of the fixed bars of the platform. It consists of slats $f'$, pivoted into side bars of the shoe, and arranged all at the same inclination in the direction to receive the blast from the fan. They are made adjustable by wire connection to increase or diminish the spaces between them, so that the quantity of matter that shall be allowed to pass down through the slat-openings to the sieve below, or the quantity of air that shall be allowed to pass up through them from the fan, may be regulated to meet the requirements in adapting the fanning-mill to the cleaning of all light fine seeds, such as millet, flax, clover, and timothy. It thereby forms an auxiliary separator directly to the horizontal portion of the platform, and a separator proper for the grain and chaff elevated by the slat-belt.

To prevent the coarse refuse matter from passing through the rack or second platform to the sieve of the shoe, wires $g$ are arranged in the rack-frame, at suitable distances apart across, and in notches in the edges of the slats, and form a sort of top screen independent of the slats.

At the rear end of the frame in which the slats are pivoted there is an open transverse space between it and the tail-board N of the shoe, and across this space wires $h$ extend from said rack-frame in the direction of the length of the machine, and at suitable distances apart to allow unthrashed heads and all matter that should be passed a second time through the machine to drop through behind the sieve to the tailing-spout $i$, to be delivered to the elevator, and thence to the cylinder.

In light fine seeds, where a diminished blast must be used, a revolving picker, P, arranged above the rack-separator just over the rear end of the slat-frame, serves as an important auxilliary to the said supplemental separating-platform by picking up and tossing over the coarse refuse matter that would accumulate on the rear end of said rack, too much of which would pass to the elevator.

The rack L not only serves the purpose of making a second separation of all matter passing through the slotted platform, but, in connection with the wind-boards $j\, j\, j'\, j'$, it gives the operator the most complete control of the blast, so that he may increase or diminish its strength at any point in the length of the sieve, or make it of uniform strength throughout its entire length. Such rack also obviates the necessity of having different sets of sieves for different kinds of grain, for with it and one sieve wheat, rye, oats, barley, buckwheat, millet, flax, clover, and timothy seed may be well cleaned. The wind-boards are arranged, two of them, $j\, j$, in the frame, one above the other, and within the throat of the fan-case, and two, $j'\, j'$, are arranged in horizontal line within the shoe, beneath the sieve M, which is placed a short distance below and parallel with the rack, and secured in place by being clamped to angle corner-plates $k\, k$ by thumb-screws $l$ at the rear edge of the sieve-frame. The sieve-frame rests upon side cleats, its inner end being held down by the angle-plates $k$, while its rear end is secured and prevented from being lifted or displaced by the shake of the shoe by the screws.

The bottom $m$ of the shoe extends over the tailing-spout $i$, and forms by such extension a cut-off or pivoted section, $n$, the object of which is to effect a division of the cleaned grain falling through the sieve by depressing the pivoted section so as to as open into the tailing-spout $i$, to receive the less-perfectly cleaned grain, as shown by dotted lines in Figs. 1 and 4. The best of the grain passes through the front portion of the sieve into the grain-spout $s$, while the shrunken, broken, and unsound wheat and the cheat and foul seeds will be forced farther back before passing through the sieve. This cut-off is closed when the tailings show a run of much sound grain, and the tailings then pass under the cut-off into the spout $i$, from which they are carried by the elevator to the cylinder, to be again subjected to the winnowing process.

The grain-spout $s$ is pivoted at its under side in the middle of its length to two side-boards, $t$, of the shoe, and which form false sides to said spout, which latter is made tapering from the middle to the ends, and is adapted to be tilted to deliver the grain on either side of the machine, as may be required, stationary spouts $u$ being attached to the sills of the frame to convey the grain to the measure. The shoe is adapted for end-shake, and is hung at or near its front end by pivots to the upper ends of vertical bar-springs $p$, at each side, firmly attached to and rising from the sills, while suspension-rods $q$, attached to the casing, (one at each side,) support the rear end of said shoe, as shown more fully in Fig. 4. These suspension-rods are made adjustable at their points of attachment to the casing by slots $r$ and clamp-screws $v$, either toward the front or the rear of the machine, for the purpose of facilitating or retarding the passage of the straw and coarse matter over the separating-rack, as may be desired. For a diminished blast the maximum speed of the matter over this rack is obtained by adjusting the pivots $v$ to the front ends of the slots; and for a stronger blast the minimum speed is obtained by adjusting the pivots $v$ to the rear ends of said slots. To change these rods from perpendicular positions gives the rear end of the shoe a vertical movement—that is, the frontward adjustment of the rods causes the rear end of the shoe to rise in its backward movement and to fall correspondingly in its frontward movement. The adjustment of these rods to the rear out of perpendicular gives the reverse movements to the shoe. The endwise shake of the shoe is obtained from cranks $w$ on the rear crank-shaft, E, of the toothed-bars by means of levers R, depending from said cranks, one on each side of the frame, to which they are connected by pivoted arms R', which form the fulcrums of said levers, whose lower ends have pivot-connections with spring-arms S, rigidly secured to the shoe at their front ends. The pivoted arms R' accommodate the vertical throw of the cranks; and the horizontal and vertical spring-arms $p$ S give more uniform and easy movements to the shoe than can be obtained from unyielding connections. As there can be no horizontal movements of the pendent levers R at their fulcrum-points when the cranks $w$ are revolved, and there must be such movements at the ends of such levers corresponding to the throw of said cranks, the consequence is that the shoe has a horizontal movement imparted to it. As the pendent levers R are closely boxed to the cranks $w$, they must have vertical movements corresponding to the throw of the cranks, and this is admitted by the working of the fulcrum-arms R' and the yielding of the horizontal spring-arms.

As the concave is pivoted to a rod running through the machine below the cylinder and on a vertical line with its center, and as the front edge of the concave is adjusted to the cylinder vertically with the feed-board T, an open space, $x$, is left beneath the concave, and as more or less grain will pass out through the opening at the joining of the concave and feed-board, I hinge a piece of sheet metal, $z$, Fig. 1, to the under side of the feed-board, so as to overlap and rest upon the end frame-timber, V, and thus close the opening $x$ between said timber and the concave, and direct such escaping grain into the closed space beneath the concave and upon the grain-board of the endless slat elevator, as shown in Fig. 1.

The machine is mounted upon front and rear wheels, W, upon which it is transported and upon which it stands when at work, and the axle X and bolster Y of the front wheels are tapering, so as to give a central support, as shown in Fig. 3, to allow of the tilting of the axle as the wheels pass over obstructions.

To prevent the swaying of the machine when at work and to hold it firmly, I provide means for supporting the front of the machine directly upon the wheel-hubs. A flanged casting, $y$, is bolted to each end of the bolster X, such casting being provided with a screw-threaded opening, through which a strong screw-stem, $y'$, passes in position to bear directly upon the sand-bands of the wheel-hubs, and upon which they are screwed down when the machine is at work, and thus lock the wheels, axle-tree, bolster, and machine. To make such lock on the axle-tree there would still be considerable jar and vibration, on account of the looseness of the wheels upon the axle. The clamping-screws are provided with hand-wheels $y^2$, which also serve as ratchets, with which pawls (not shown) engage to prevent the screws from working loose. When it is desired to move the machine the screws are raised.

The fan I is arranged beneath the upwardly-inclined grain-board K, and has an overblast, which is directed alike beneath the sieve and the rack separator.

The sills of the frame are of two sections, A' and B', so that in turning the machine the wheels will pass under the front sill-section, which is higher than the rear section.

The receiving end of the grain-elevator $C^2$ is placed above the hind wheels, so that the machine will track upon wagon-roads.

The stacker can be folded over upon the rear flat portion of the platform-casing.

The beating-bars are united in sections and mounted upon crank-shafts in any suitable manner. The stationary bars are about four inches wide and from ten to twelve feet long, and are supported only at each end upon girts Q, the angle-ridge C' serving to brace them against sagging in the middle of their length. The cranks for operating the beating-bars are arranged in halves, quarters, or thirds, and each crank has a throw of about six inches, and operate the bars in sections of three, giving a continuous motion to the several sections, but no two in the same direction at the same time. As the movements of the bars are rotary, they open and close the slots in each revolution; but whatever their position there is always more or less of the slots open at the junction of the platform with the concave, so that the deflector always acts to drive the grain through these openings.

The slats of the rack separator L are connected at their lower edges by a wire, $g'$, Fig. 5, which is operated by a crank-arm, $g^2$, so as to open and close the slats more or less, as required, and operated from the outside. These slats may be connected in sections, made adjustable independent of each other.

In Fig. 1 the belting for operating the several parts is shown by dotted lines. In Fig. 3 the section is taken looking both to the rear and to the front.

It will be noticed that the openings $d$ are coincident with the openings between the fixed bars C of the platform, and therefore form a continuation of said openings beneath the concave, and thus prevent the choking of the grain at the point where the said bars join the rear edge of the concave, so that at this point the openings $d$, beneath the front edge of the concave, and the openings between the fixed bars in front of the concave serve to give a free discharge of the grain as it is thrown over the cross-bar F and beaten down by the deflector G.

It is also important to notice that by having the wires $g$ fixed and independent of the pivoted slats $f$ the latter can be adjusted to project a greater or less distance above said wires, and by this means regulate the speed of the chaff and light stuff over the second separating-platform.

It is also important to notice that by terminating the bottom grain-board, $m$, of the shoe in a pivoted section said grain-board can be lengthened or shortened, for the purpose stated, by opening or closing said pivoted part in relation to the plane of the grain-board, and thus allow of a compact arrangement of these parts with the sieve M and spout $i$.

Another important matter is that the means for giving the rear end of the shoe a rising or a falling movement to facilitate or to retard, as may be desired, the passage of the coarse matter over the separating-rack L co-operate with the adjustable capacity of the slats of the supplemental platform L to regulate the force of the blast through said platform.

I have stated that the spring-arms $p$ S give an easy and uniform movement to the shoe; but they serve another important purpose in aiding the upward and rearward throws of the toothed bars D, as in these movements said bars are loaded with the straw. The spring-bars S act with an upward force as the cranks $w$, Figs. 3 and 4, are on their upward sweep, and the spring-bars $p$ act with a rearward force as these cranks are on their backward throw from the cylinder, whereby the operation of the toothed platform-bars is rendered more uniform.

In grain thrashing and separating machines, I claim—

1. The openings $d$ between the cross-girt Q and the offset F at the rear edge of the concave, and coincident with the openings formed by the fixed bars C of a platform, through the slots of which toothed beater-bars operate in line with and in close proximity to said openings $d$, for the purposes described.

2. In a machine for thrashing and separating grain, the separating and straw-carrying platform composed of the fixed bars C and the toothed beating and straw-carrying bars D, the former extending with an upward inclination from the concave B to a point from which they terminate in horizontal planes, forming a fixed cross angle-ridge, C', at or near the middle of the length of the platform, and the said movable bars having like upwardly-inclined and horizontal parts forming cross-ridges D', and adapted to operate with said angle cross-ridges D', moving above, across, and below the cross-ridges of the fixed bars, substantially as described, for the purpose specified.

3. The supplemental separating-platform L, composed of adjustable slats $f'$, pivoted as described, in combination with the wires $g$, fixed to and extending across the frame independent of the slats for adjusting the latter independent of said wires, for the purpose of increasing or diminishing the projection of the upper edges of the slats above said wires, and of increasing or diminishing the space between said slats, substantially as set forth.

4. The supplemental separating-platform L, composed of adjustable slats $f'$, the independent wires $g$, and the wires $h$, extending from the rear end of said platform to the tail-board N of the shoe, substantially as and for the purpose set forth.

5. The shoe made adjustable at its rear end, substantially as set forth, by which it may be caused either to reciprocate horizontally or to have a rising or a falling movement at its rear end upon its back throw only, in combination with the spring-bars $p$, supporting the front end of said shoe, substantially as and for the purposes set forth.

6. The combination, with means, substantially as herein set forth, whereby the rear end of the shoe is adjusted for horizontal movement, a rising movement at its rear end, or a falling movement at such end on its backward throws, of the supplemental separating-platform L, composed of slats made adjustable to suit the adjustment of the shoe, for the purpose described.

7. The combination, with the sieve M, the fan I, and the grain-board $m$, of the wind-boards $j'\ j'$, carried by the shoe, and the wind-boards $j\ j$ in the blast-throat of the fan, the said wind-boards being adjustable in relation to each other, the blast-throat, and sieve, as described, for the purpose specified.

8. The combination of the shoe adjustably suspended at its rear end and supported at its front end, substantially as herein set forth, with the pendent levers R, the fulcrum-arms R', the spring-bars S, and the cranked shaft E, for imparting motion to the shoe from said cranked shaft through the said pendent levers.

9. The combination, with the supplemental separating-platform L, the sieve M, and the adjustable wind-boards $j'$ $j'$, arranged within the shoe beneath the sieve, of the adjustable wind-boards $j$ $j$, arranged within the blast-throat of the fan, as herein set forth.

10. The combination of the concave and the feed-board T with the hinged closing-strip or cut-off Z, for the purpose described.

11. The combination of the truck-wheels with the screw-stems $y'$ and the bolster-castings $y$, the said screw-stems being adapted to be clamped directly upon the sand-bands of said wheels, for the purpose set forth.

In testimony whereof I have hereunto set my hand in the presence of two subscribing witnesses.

ARCHIBALD McNAUGHT.

Witnesses:
JNO. BARKER,
HENRY P. BARLOW.